Sept. 3, 1968  R. P. COUTURE  3,399,807
CONTROL OF LIQUID DISPENSING UNITS OF THE METERING TYPE
Filed March 7, 1967
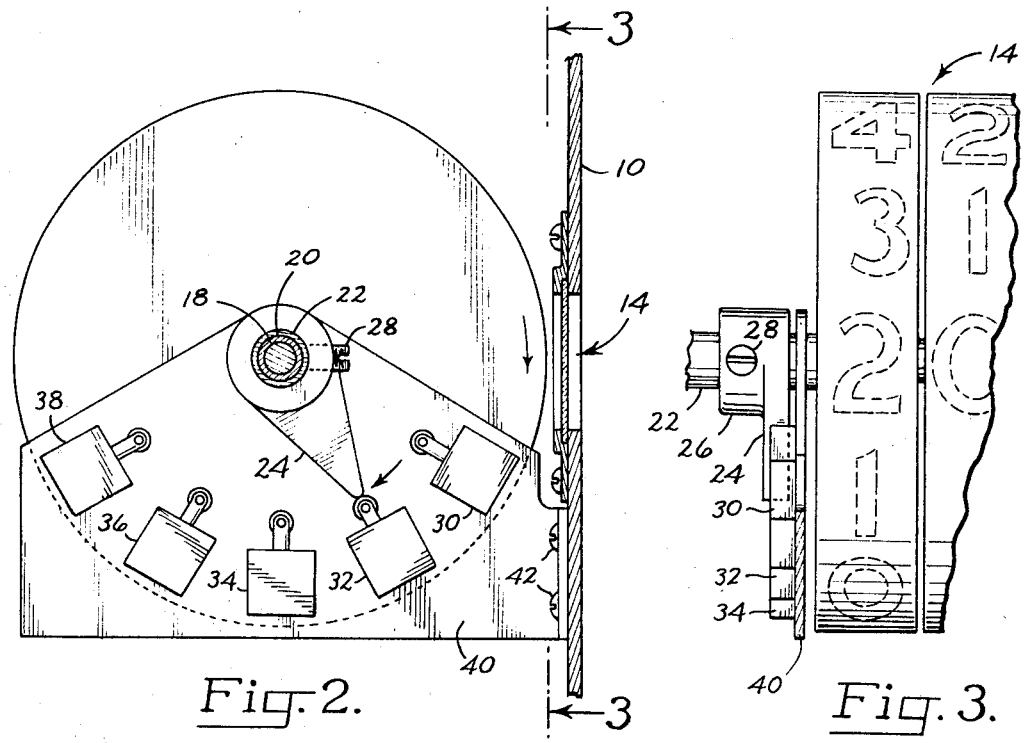
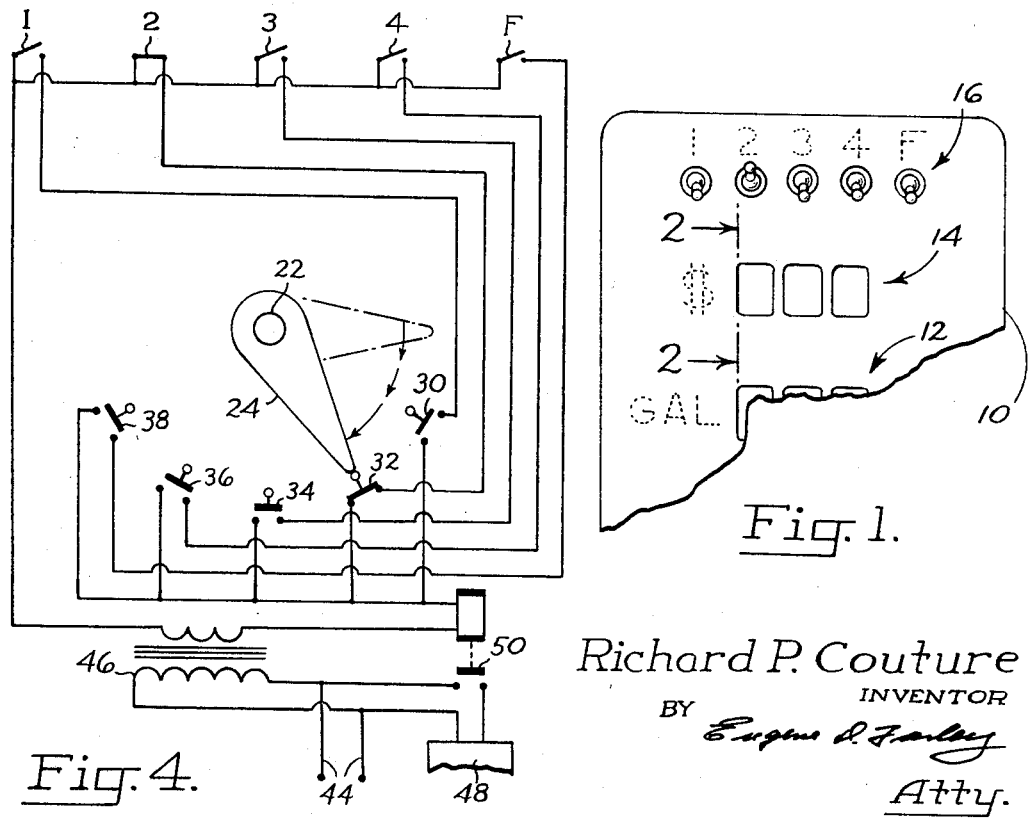
Richard P. Couture
INVENTOR
BY
Atty.

United States Patent Office 3,399,807
Patented Sept. 3, 1968

3,399,807
CONTROL OF LIQUID DISPENSING UNITS OF THE METERING TYPE
Richard P. Couture, 1715 S. Washington,
Tacoma, Wash. 98405
Filed Mar. 7, 1967, Ser. No. 621,280
1 Claim. (Cl. 222—17)

ABSTRACT OF THE DISCLOSURE

A control for metering-type liquid dispensers, particularly service station gasoline pumps, includes a cylindrical dial having its peripheral surface calibrated in dollar or other selected measuring units. When a customer requests a given amount of gasoline, the operator closes a set switch corresponding to the dollar value of the amount of gasoline requested. He then activates the pump and proceeds with the servicing of the vehicle. As soon as the desired dollar volume has been delivered by the pump, cam means associated therewith actuate an electric switch in series with the set switch, opening the circuit and shutting off the pump.

---

This invention relates to controls for gasoline pumps and other metering-type liquid dispensing units.

Although gasoline pumps are commonplace which shut off automatically when a customer's tank has been filled, the situation is otherwise when a customer requests a given dollar amount of gasoline. In this situation the attendant is under the necessity of tending the pump during the entire filling operation and shutting off the pump manually when the requested dollar amount shows on the indicator. He accordingly is prevented from performing the usual servicing operations while the tank is being filled, and in this manner loses a considerable amount of time.

It is the general object of this invention to overcome the foregoing problem by the provision of a control for a dispensing unit for gasoline and other liquids which may be preset to a given dollar amount and which operates to de-energize the pump of the unit when it has delivered a corresponding volume of liquid product.

In summary, the presently described control comprises a cylindrical dial having its peripheral surface calibrated in the selected measuring units, for example, in dollars. The dial is secured to a rotary drive shaft which mounts also the dials indicating the pump delivery in volume units. The shaft still further mounts a cam which operates the presently described control.

An electric circuit including the pump contains a plurality of electric set switches in parallel circuit relation to each other and corresponding in number to the number of measuring units on the dial. A microswitch is in series circuit relation with the set switches in each of the parallel electric circuits. Mounting means mount the microswitches adjacent the cam.

As the cam rotates with the shaft, it sequentially operates the microswitches. When it operates the microswitch in series with the selected set switch, for example, the set switch representing a three dollar value, the pump control switch is energized and shuts off the pump automatically.

In the drawings:
FIG. 1 is a fragmentary view in front elevation of a dispensing unit equipped with the herein described control;
FIG. 2 is a sectional view taken along line 2—2 of FIG. 1 and illustrating the arrangement of microswitches employed in the operation of the control;
FIG. 3 is a sectional view taken along line 3—3 of FIG. 2; and FIG. 4 is a wiring diagram illustrating the elements of the control and their relation to each other.

FIG. 1 in the drawings illustrates a gasoline dispensing unit 10 having a first series of windows 12 indicating the number of gallons dispensed, a second series of windows 14 indicating the dollar value of the gasoline dispensed and a series of set switches 16 provided in accordance with the present invention and adapted to be set at a predetermined dollar amount to be delivered. Thus in the illustrated form of the invention, four of the set switches may be used to indicate dollar amounts up to four dollars, while the fifth set switch may indicate the completely filled condition of the tank, it being likely that a customer would not indicate a dollar amount in the interval between four dollars and "full."

The indicating dials and related mechanism are driven by a series of three coaxial shafts 18, 20, 22, indicated in FIG. 2. Of this series, central shaft 18 may drive a "cents" indicator, intermediate shaft 20 a "dimes" indicator, and outer shaft 22 a "dollar" indicator. Outer shaft 22 also mounts a cam 24 which governs the operation of the presently described control.

Cam 24 extends radially from a hub 26 secured by means of set screw 28 to shaft 22.

The outer end of cam 24 scribes a circular path along which are positioned a plurality of microswitches 30, 32, 34, 36, 38. These are supported on a bracket 40 secured by means of screws 42 to the case of dispensing unit 10.

The microswitches correspond in number to the set switches of series 16. For example, microswitches 30, 32, 34, 36 and 38 correspond respectively to the set switches indicating 1, 2, 3 and 4 gallons and "full."

The set switches and microswitches are included together with a solenoid operated pump in an electric circuit illustrated in FIG. 4.

The 110 volt houselines 44 feed parallel circuits, one including a transformer 46 and the other a pump 48 for gasoline or other liquid to be dispensed. The circuit for the pump is opened and closed by means of a solenoid operated switch 50.

The low voltage side of transformer 46 includes set switches 1, 2, 3, 4 and F in parallel circuit relationship. Each of the parallel circuits contains one of the microswitches 30, 32, 34, 36, 38 in series circuit relation with its respective set switch.

Thus in the operation of the control, when one of the set switches, for example set switch 2, is moved to the closed position indicating that the customer wishes two dollars worth of gasoline, the operation of the pump will rotate shaft 22, and cam 24 which it carries, closing in sequence microswitches 30, 32, 34, 36 and 38.

As long as the set switches remain in the open position, such closure of the microswitches has no effect. However, when the cam strikes the microswitch in series with one of the set switches which has been closed, in this case set switch No. 2, a circuit is closed through solenoid operated switch 50. This breaks the circuit feeding pump 48, shutting down the pump and stopping the delivery of gasoline at precisely the correct dollar amount.

In this manner the attendant is able to select the dollar amount of gasoline ordered by the customer, set the corresponding switch, turn on the pump, and service the car while the tank is filled. As soon as the correct dollar amount has been delivered, the pump will shut off automatically.

It accordingly will be seen that there is provided an apparatus in which the several objects of this invention are achieved and which is well adapted for the conditions of practical use.

It is to be understood that the form of my invention herein shown and described is to be taken as a preferred example of the same and that various changes in the shape, size and arrangement of parts may be resorted to without departing from the spirit of my invention or the scope of the subjoined claim.

Having thus described my invention, I claim:

1. For use with a metering, liquid-dispensing unit provided with a rotary drive shaft and a pump, a pump control comprising
   (a) a cylindrical dial having its peripheral surface calibrated in selected measuring units,
   (b) securing means for securing the dial to the rotary drive shaft,
   (c) cam means attached to the drive shaft for rotation therewith,
   (d) an electric circuit for the pump,
   (e) a normally closed pump control switch in the electric circuit of the pump,
   (f) an electric actuator for the pump control switch,
   (g) an electric circuit for the switch actuator,
   (h) a plurality of normally open electric set switches in the electric switch actuator circuit in parallel circuit relation to each other and corresponding in number to the number of measuring units on the dial,
   (i) a plurality of normally open microswitches, one in each of the parallel electric switch actuator circuits in series circuit relation with the set switch therein, and
   (j) mounting means for mounting the microswitches adjacent the cam means for sequential closing with the rotation of the cam means,
   (k) the electric switch actuator circuit operating upon closure of the microswitch associated with a selectively closed set switch to activate the switch actuator to open the pump control switch and deactivate the pump.

References Cited

UNITED STATES PATENTS

| | | | |
|---|---|---|---|
| 3,122,271 | 2/1964 | Grant | 222—17 |
| 3,341,076 | 9/1967 | Wasilewski et al. | 222—76 |

STANLEY H. TOLLBERG, *Primary Examiner.*